July 4, 1961

I. F. BYRNES ET AL 2,991,466

RADAR

Filed Nov. 25, 1957

INVENTORS
IRVING F. BYRNES &
CHARLES E. MOORE
BY
ATTORNEY

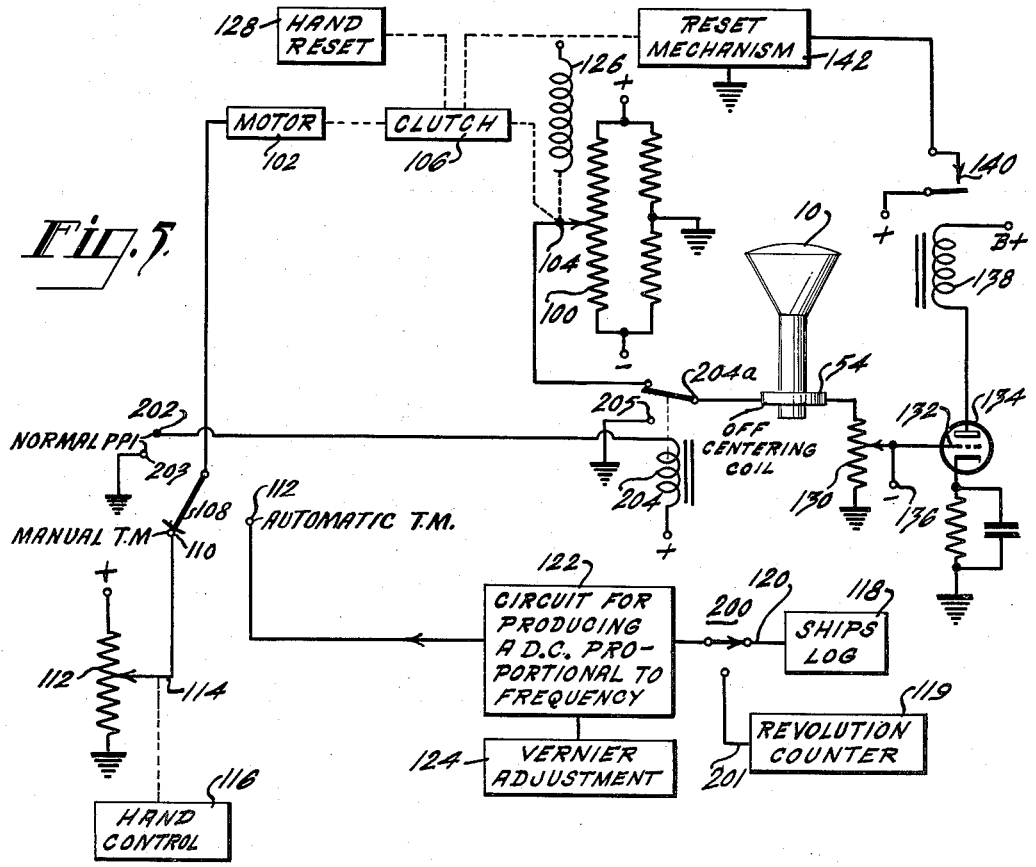
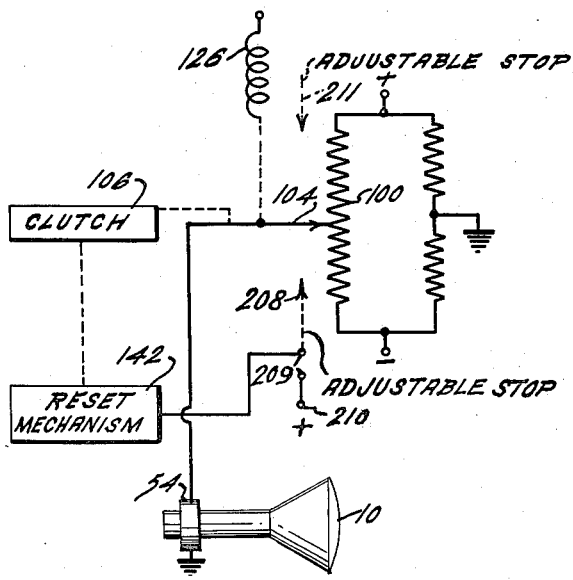

United States Patent Office 2,991,466
Patented July 4, 1961

2,991,466
RADAR
Irving F. Byrnes, New York, and Charles E. Moore, Port Washington, N.Y., assignors to Radio Corporation of America, a corporation of Delaware
Filed Nov. 25, 1957, Ser. No. 698,855
11 Claims. (Cl. 343—11)

The present invention relates to radar and particularly to improved display systems for shipboard or other mobile radar systems.

In the conventional form of PPI (plan position indication) display, the indicator (a cathode ray tube) is fixed to the ship or other vehicle on which the radar system is mounted. The indicator deflection voltages deflect the electron beam in synchronism with the rotation of the antenna. The phasing between the antenna rotation and the electron beam deflection is such that when the antenna points to the head of the ship, the cathode ray tube beam is deflected toward the top of the indicator screen.

For shipboard applications, the above type of display is disadvantageous in one important respect. When the ship turns or yaws, the image on the cathode ray tube blurs or smears due to the persistence of the indicator screen. One solution to this problem is to synchronize the beam deflection means of the indicator with the ship's compass. This stabilizes the presentation with respect to a geographical reference thereby preventing smearing. However, this form of stabilized presentation is disadvantageous as it does not enable the operator easily to determine the relative bearings of targets. For example, if the vessel is heading south and the top of the presentation is north stabilized, a target dead ahead appears at the bottom rather than the top of the screen, and one to the left appears at the right rather than the left of the screen.

The system of the present invention provides an indicator display in which the top of the screen is always referred to the head of the ship. Moreover, means are provided for lessening or eliminating any smearing in the visual presentation.

In its most general form, the invention comprises a movable persistent screen, means independent of the screen for producing a movable indication on the screen, and means for moving the screen, when the indication moves, in the same direction and amount as the movement in the indication. In a shipboard installation, the screen may be rotatably mounted. The indication on the screen may be an indication of the relative position of a target. When the ship turns in one direction, thereby causing movement of the indication through the same angle in the opposite direction, the screen is rotated through said same angle in said opposite direction. Accordingly, the indication continues to energize the same area on the screen during the turn as before the turn and there is no smearing. Moreover, the relative bearing of the indication remains accurate before, during and after the turn.

In a specific form of the invention, the persistent screen is the fluorescent screen of a cathode ray tube. The tube is rotatably mounted and includes electron beam deflecting means for radially deflecting the electron beam in plan position fashion across the screen. The beam deflecting means is independent of the tube in the sense that rotation of the tube does not affect the direction in which the electron beam is deflected by the beam deflecting means. A source providing a directional reference, such as a compass repeater motor, is connected to the tube and rotates the same in accordance with the directional reference.

In a preferred form of the invention, a first bearing scale may be marked, mounted or otherwise indicated on the peripheral edge of the cathode ray tube and a stationary second bearing scale may be placed adjacent to the first scale. The scale on the tube rotates with the ship's compass, and it therefore gives an indication of the true bearing of the ship. Zero on the stationary bearing scale points to the head of the ship. The stationary scale is a relative bearing scale.

The system above may also include means for indicating "true motion" that is, motion of one's own position with respect to the surrounding area. In this form of the invention, one's own position on the indicator screen always moves from the bottom of the screen toward the top of the screen, regardless of the ship's heading. Thus, the means for deflecting the starting position of the beam is relatively simple and can be a potentiometer driven at a speed related to the ship's speed. Voltages representative of two coordinates of a position are not required. In this form of the invention, when own ship's position is at or near the center of the indicator screen, there will be little or no smearing of other targets as own ship turns or yaws. When own ship's position is at the top or bottom of the indicator screen, the amount of smearing of other targets under the same conditions is not greater than that obtained with the conventional PPI display described at the beginning of this specification.

The invention will be described in greater detail by reference to the following description taken in connection with the accompanying drawing in which:

FIGURE 5 is a more detailed block and schematic diagram of a portion of the circuit of FIGURE 3; and FIGURE 6 is a block and schematic circuit diagram of a modified form of the circuit of FIGURE 5.

Throughout the drawing, similar reference numerals are applied to similar elements.

Figure 1:
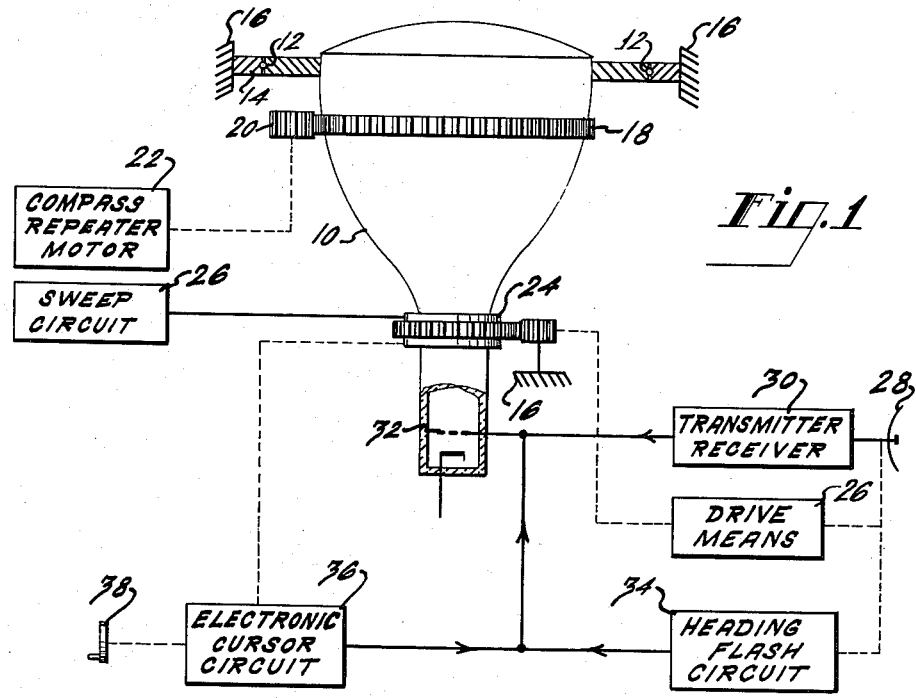
FIGURE 1 is a block circuit diagram of one form of the present invention.

Referring to FIGURE 1, cathode ray tube 10 is rotatably mounted by means of bearings 12 to chassis 14. As indicated schematically by symbols 16, chassis 14 is fixed to the ship. A gear 18 is fixedly mounted to the circumferential surface of tube 10. The gear is driven by a pinion 20 which is controlled by a directional reference source such as the compass repeater motor 22.

A rotatable magnetic deflection coil 24 is positioned around the neck of the tube. The coil is driven by the same drive means 26 which drives the antenna 28 of the transmitter-receiver 30 of the radar system. Sawtooth sweep voltages for radially deflecting the electron beam of tube 10 are applied to the coil 24 from sweep circuit 26. As is understood by those skilled in this art, the sweep circuit is synchronized with the pulse transmissions from the transmitter portion of block 30. The connection is not shown.

Echo pulses received by the directive antenna 28 and detected and amplified in the receiver portion of block 30 are applied to control grid 32 for intensity modulating the radially deflected electron beam. A cam, not shown, on the shaft of antenna 28 actuates the heading flash circuit 34. This circuit may merely be a switch which is closed once each antenna revolution. The circuit applies a voltage pulse to control grid 32 each antenna scan period and thereby produces a radial "heading flash" on the tube once each such period.

The electronic cursor circuit 36 may be similar to the heading flash circuit. It may include a cam which is actuated by the rotating coil 24. The phasing between the cam and the rotating coil is manually controllable, and this is indicated schematically by hand wheel 38. A dial, not shown in FIGURE 1, indicates the angle between the electronic cursor line and the heading flash line (see FIGURE 2). Alternatively, the electronic cursor circuit may be controlled directly from the antenna. In this form of circuit, a servo system may be employed to transmit a signal indicative of the antenna position to a servo motor located near the electronic cursor circuit. Here, a cam would be actuated once each antenna rotational interval by the shaft of the servo motor. Again, the phasing between the motor shaft and the cam is controllable by means of the hand wheel 38.

It is to be understood that the illustration of FIGURE 1 is highly schematic and merely indicates one of several alternative circuit arrangements. For example, in ordinary practice, rather than being directly driven by the drive means, rotating coil 24 may be connected to the antenna via a synchro or servo system. A fixed magnetic or electrostatic deflection system may replace the rotating coil 24. In systems of this type, the currents or voltages applied to the deflection system cause a rotating, beam deflecting field.

The directional reference illustrated is a compass repeater motor 22, and it may be coupled to a magnetic or gyro compass. The repeater motor may be one of the step-by-step type or it may have a continuous output.

The heading flash and electronic cursor circuits shown may be replaced with circuits which include separate deflection coils placed about the neck of the cathode ray tube for radially deflecting the beam. The sweeps for these circuits may be time shared with the regular PPI sawtooth sweeps. Slip rings and other conventional elements not necessary to an understanding of the invention are not shown.

Figure 2:
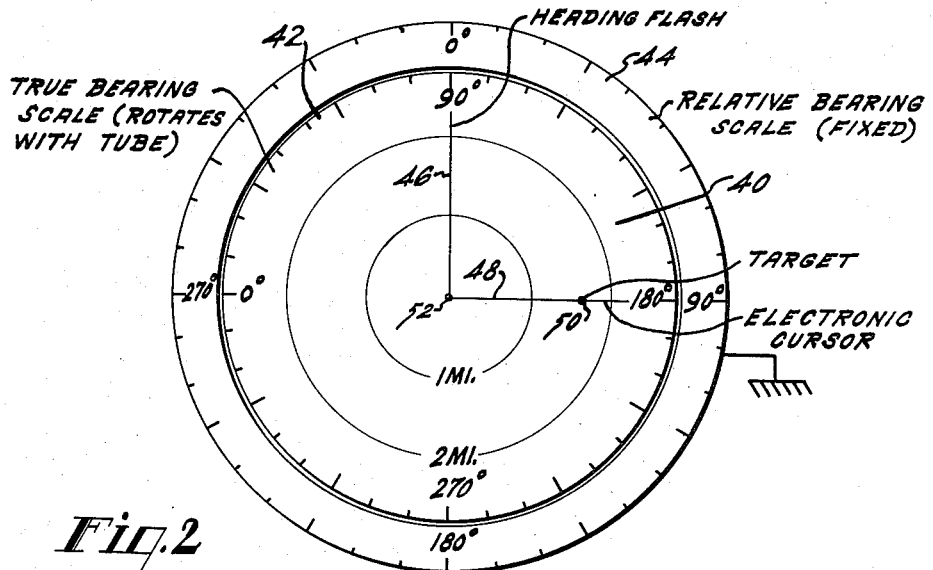
FIGURE 2 is a view of the screen of the system of FIGURE 1.

The operation of the system of FIGURE 1 can be best understood by referring to FIGURE 2. The screen of tube 18 is illustrated at 40. A true bearing scale 42 which rotates with the tube is mounted to or otherwise shown on the circumferential edge of screen 40. A relative bearing scale 44 is fixed to the chassis and circumferentially arranged about the scale 42. For purposes of illustration, a display is shown on the 3 mile range and range markers labeled 1 mile and 2 miles are visible. The heading flash circuit 34 (FIGURE 1) places an intense strobe line 46 which always points to the head of the ship on the indicator screen. The electronic cursor circuit 36 (FIGURE 1) places a second intense strobe line 48 on the indicator screen. The angle made by line 48 with line 46 is adjustable, as already mentioned.

Referring still to FIGURE 2, a target 50 is located at 1½ miles and to the right of the direction in which the ship is heading. Own ship's position 52 is always at the center of the screen. If the electronic cursor circuit is adjusted to a position such that the strobe line 48 intersects the target, one can read on the inner, movable scale the true bearing of the target and on the outer fixed scale 44 its relative bearing. In the case illustrated, it can be seen that the relative bearing of the target is 90° and the true bearing is 180° or due south. It can also be seen from the intersection of the heading flash strobe line and the true bearing scale 42 that the ship is heading at a bearing of 90°, that is, due east.

Suppose, for a moment, that the ship should yaw through an angle of 5° to the right. If this happened in a conventional indicator, the spot 50 would smear in an upward direction. In other words, the portion of the energized screen formerly centered at 90° would, due to the persistence of the screen, remain energized. A new portion of the screen, however, would become energized centered at 85° on scale 44, due to the new relative bearing of the target, resulting in smearing. According to the present invention, when the ship yaws 5° to the right (clockwise), the tube is rotated 5° counterclockwise. The target, rather than appearing at a relative bearing of 90°, now appears at a relative bearing of 85°. However, there is no smearing. This is because the tube screen moves in exactly the same direction and amount as the movement of the target. Moreover, the true bearing of the target remains correctly indicated. The true and relative bearings may be read directly from scales 42 and 44. Or, the electronic cursor circuit may be adjusted so as again to position the cursor strobe line through the target and the relative bearing read from the dial on element 36 (see FIGURE 3). No adjustment of the heading flash is necessary. The counterclockwise rotation of the tube through an angle of 5° causes the heading flash now to point to 95° on the true bearing scale, the new ship's heading. The heading flash continues to point to 0° on the relative bearing scale.

Figure 3:
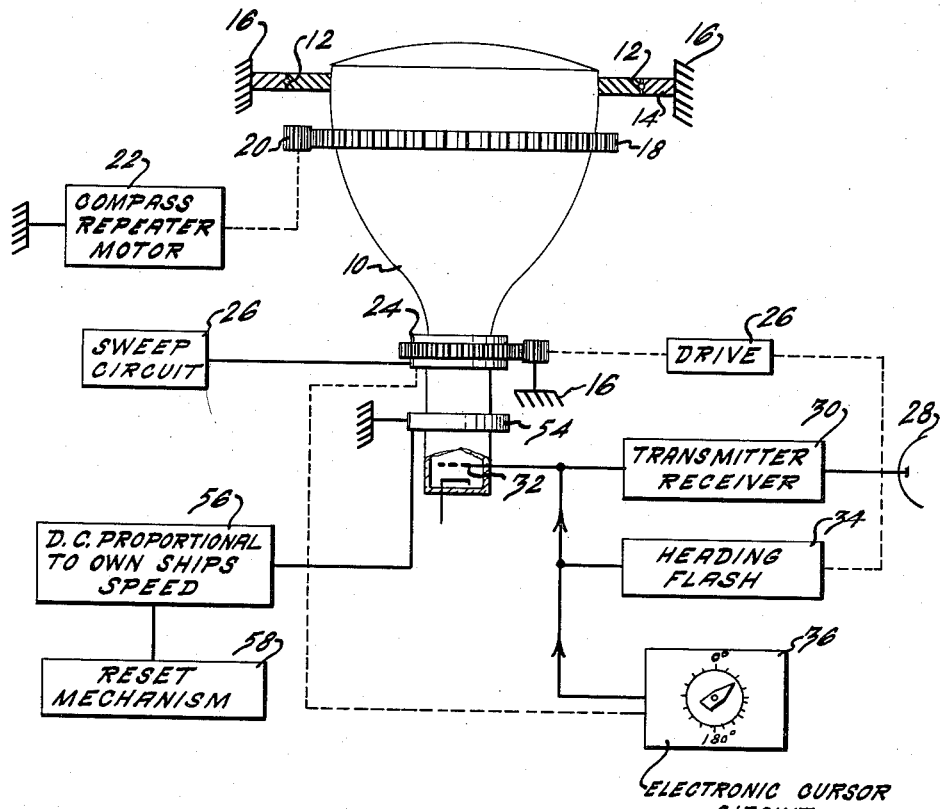
FIGURE 3 is a block circuit diagram of another form of the present invention.

A form of the invention which is useful for indicating "true motion" is shown in FIGURE 3. Elements which are similar in function and structure to corresponding elements of the system of FIGURE 1 have the same reference numerals applied and need no further explanation. In addition, there is positioned about the neck of cathode ray tube 10 a so-called off-centering coil 54. The amount of current through the coil determines the starting position of the radially deflected electron beam. In the present form of true motion system, coil 54 is so oriented that the electron beam is deflected only in the up and down direction, that is, the direction along the line extending from 0 to 180° on scale 42, and vice versa.

The deflection current applied from block 56 to the off-centering coil 54 is one which changes at a rate proportional to own ship's speed. A number of alternative circuits may be employed for this purpose. As one example, the circuit may merely be a potentiometer which is driven by a motor, the speed of which is made equal to that of own ship's speed. The speed control may merely be a hand control. Alternatively, the speed control may be automatic. It may be derived from the ship's log or the ship's screw. A vernier correction may be added to compensate for ocean currents and wind velocity.

The reset mechanism 58 may consist of a hand control for automatically returning the potentiometer to a value such that own ship's position appears at the bottom of the indicator screen. Alternatively, or additionally, the potentiometer may be provided with a spring mechanism which is automatically thrown when the current through the off-centering coil exceeds a given magnitude or when the arm on a potentiometer reaches a mechanical limit. Thus, own ship's position automatically returns to the bottom of the indicator screen after a predetermined distance covered by one's own ship.

One form of true motion circuit such as described above, including a reset mechanism, is shown in somewhat more detail in FIGURE 5. The current through off-centering coil 54 is determined by the setting of potentiometer 100. Motor 102 drives the slider 104 of potentiometer 100 through clutch 106.

When switch 108 is in the manual true motion position (110), the speed at which the motor is driven depends upon the setting of potentiometer 112. The setting is made to correspond to the ship's speed, as corrected for ocean currents and winds. The position of slider 114 is determined by hand control 116 which may be a knob, hand wheel or the like.

For the sake of drawing simplicity, the motor 102 is shown for only a single range displayed on the indicator. It will be appreciated, however, that when the range displayed changes, the speed at which the spot moves across the indicator screen also should change. For example, on the 50 mile range, the spot indicative of own ship's position moves across the screen at a much slower rate than on the 3 mile range. In a preferred form of the invention, the range switch (not shown) may be ganged to a speed control switch for the motor. The arrangement is such that at the longer ranges a given direct voltage applied to the motor drives the motor at a slower speed than at the shorter ranges. The motor speed control may merely be a plurality of resistors of different values and means for selecting one or more of them to adjust the direct voltage applied to the motor to a proper value for driving the motor.

When switch 108 is in position 112, the system is automatic. In this position, the speed at which the indication moves across the screen of the cathode ray tube may be controlled either by the ship's log 118 or the revolution counter 119, depending upon the position of switch 200. It is to be understood that, if desired, switch 200 may be made a part of switch 108.

The ship's log 118 produces a signal at lead 120 which has a frequency proportional to the speed of the ship (neglecting ocean currents and wind). The revolution counter 119 may be connected to the shaft which drives the ship's screw and it too produces an output frequency at lead 201 which is proportional to the speed of the ship (neglecting ocean currents and wind). Block 122 represents a circuit for producing a direct current proportional to frequency. The vernier adjustment 124 connected to block 122 functions to reduce or increase the direct current output of circuit 122 to compensate for ocean currents and wind. The vernier adjustment may, for example, be a potentiometer in the output circuit of block 122.

The operation of the circuit as described so far is as follows. In the manual mode of operation, slider 114 of potentiometer 112 is positioned to a value such that the echoes from fixed targets remain in fixed positions on the indicator screen during linear movement of the ship. When switch 108 is in the automatic true motion position, vernier adjustment 124 may be adjusted to a value such that the same occurs. This vernier adjustment may be common both to the operation with switch 200 connected to the ship's log, and with switch 200 connected to the revolution counter. The vernier adjustment may be merely a hand adjustment or, in more fully automatic systems, an adjustment controlled by ocean current determining and wind indicating instruments on the ship.

The circuit of FIGURE 5 also includes a third position of switch 108 in which the two contacts 202, 203 are connected together. When the switch is in this position, there is normal PPI operation. The connection of contacts of 202 and 203 together applies current to relay 204 so that the circuit between slider 104 and off-centering coil 54 is broken. At the same time, the off-centering coil is connected to ground via terminals 204a and 205. Thus, the radial sweeps always originate at the center of the indicator screen and the true motion potentiometer 100 is disconnected from the circuit.

If desired, terminal 205 may be connected to the slider of a manually controllable potentiometer similar to potentiometer 100. This enables one to shift the starting position of the radial sweeps.

The reset mechanism for potentiometer 100 includes a coil spring 126 connected to potentiometer slider 104. The motor drives the slider through the clutch in opposition to the tension of the spring. The slider may be reset manually, whenever desired, merely by manually disengaging the clutch. Hand reset mechanism 128 performs this function.

The automatic reset mechanism may include a resistor 130 in series with the off-centering coil 54. A tap on the resistor is connected to the control grid 132 of a triode 134. The triode is normally biased beyond cut off by a negative voltage applied to terminal 136. A relay coil 138 is in series with the anode-to-cathode circuit of the triode.

In operation, when the current through off-centering coil 54 exceeds a preset level, triode 134 is driven into conduction and the contacts 140 of the relay close. A direct current is then applied through the contacts to reset mechanism 142. The reset mechanism may simply be a solenoid which, when actuated, disengages clutch 106 allowing spring 126 to return slider 104 to its starting position.

FIGURE 6 illustrates another form of reset mechanism for the circuit of FIGURE 5. In this form of the invention, triode 134 (FIGURE 5) may be eliminated. The reset, rather than being controlled by the current through the off-centering coil, is instead mechanically controlled by the position of slider 104 along potentiometer 100.

Referring to FIGURE 6, during the ship's motion, slider 104 moves in the down direction (as viewed in the figure) against the tension of coil spring 126. The motor 102, which drives the slider 104 through clutch 106, is not shown. When the slider reaches a point on the potentiometer such that the spot on the screen indicative of own ship's position should be reset, adjustable stop 208 is engaged. This closes contacts 209 and the voltage at terminal 210 is applied to the reset mechanism 142. The latter disengages the clutch, in the manner already described, and spring 126 resets slider 144 to the other end of the potentiometer. Located at the other end of the potentiometer is a second adjustable stop 211.

The position of stop 208 controls the position at the top of the indicator screen from which reset action is started. The position of stop 211, on the other hand, controls the position at the bottom of the indicator screen at which own ship's position is reset. An advantage of this arrangement over the one of FIGURE 7 is that it is simpler and cheaper and requires no electron tubes. Moreover, both stops can easily be adjusted.

Figure 4:
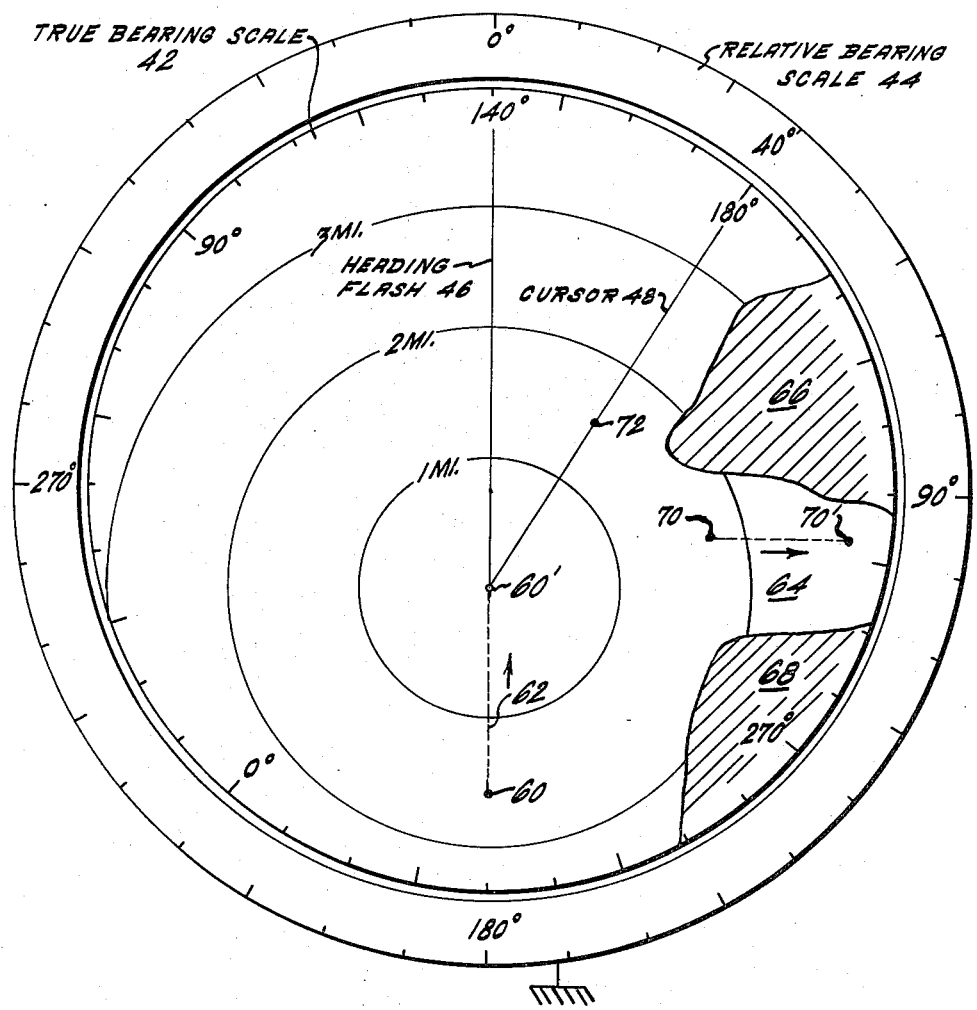
FIGURE 4 is a view of the screen of the system of FIGURE 3.

The screen of the indicator of FIGURE 3 is shown in FIGURE 4. The starting position of own ship is shown at 60 near the bottom of the indicator screen. The course of the ship is indicated by dotted line 62 and, in a practical form of the invention, is indicated by a fluorescent tail immediately behind own ship's indication. The length of the tail is a function of the screen persistence and own ship's speed. After a time $t$, own ship has travelled from position 60 to position 60'. A harbor 64 between two land masses 66 and 68 is shown to the right. The harbor and land masses appear to remain stationary during the time $t$. Another ship moves from position 70 to position 70' during the time $t$. A buoy is shown at 72 and the electronic cursor is positioned intersecting the buoy indication.

In the above connection, it should be mentioned that when own ship's position is at a place other than the center of the indicator screen, the bearing scales do not accurately give the bearings of other objects with respect to own ship. Thus, if cursor 48 were extended, it would pass through a relative bearing of about 40° indicating that the buoy was 40° from the direction in which the ship is heading. However, the actual buoy position is closer to 35° or so as would be indicated on the electronic cursor circuit dial. The reason for the discrepancy is believed to be self-evident. The reason, in brief, is that if own ship's position moves further below the center, the extension of cursor 48 becomes increasingly longer and gives increasingly larger angle readings. The reverse holds for the case in which own ship's position is above the center of the indicator screen.

What is claimed is:

1. In a true motion radar system, means for producing a display which includes a moving mark indicative of own ship's motion; reset means for resetting said mark, said reset means including a potentiometer comprising a resistor and a slider for supplying a voltage that is a function of the position of the slider; means for driving said slider along said resistor at a speed related to the speed of movement of the radar system; and means responsive to the movement of said slider to a predetermined position along said resistor for resetting said slider to a new position along said resistor.

2. In a true motion radar system, means for producing a display which includes a moving mark indicative of own ship's motion; reset means for resetting said mark, said reset means including a potentiometer comprising a resistor and a slider for supplying a voltage that is a function of the position of the slider; means for driving said slider along said resistor at a speed related to the speed of movement of the radar system; a first stop on one portion of the potentiometer; a second stop at another portion of the potentiometer; and means responsive to the movement of said slider along said resistor to said first stop for resetting said slider along said resistor to said second stop.

3. In the true motion radar system as set forth in claim 2, further including means for adjusting the positions of said stops.

4. In a true motion radar system, means for producing a display which includes a moving mark indicative of own ship's motion; reset circuit means for resetting said mark; and means responsive to said mark being moved a predetermined distance from the center of said display for actuating said reset circuit.

5. An automatic reset circuit for a true motion radar system comprising, in combination, means for producing a voltage which varies proportionally to the speed of movement of said radar system; and means responsive to a given value of said voltage for changing the same to a new, widely different value.

6. An automatic reset circuit for a true motion radar system comprising, in combination, a cathode ray tube including an electron beam deflecting means; means for producing a direct voltage the amplitude of which varies proportionally to the speed of movement of said radar system and applying the same to said beam deflecting means; and circuit means responsive to the deflection of said electron beam through a given angle for changing said voltage to a new value.

7. In a true motion radar system including a cathode ray tube and a deflection means for deflecting the beam of said tube across the screen thereof, means for applying a direct current to said beam deflecting means which changes at a rate proportional to the rate of movement of said radar system; and means responsive to deflection of said beam by said deflection means to one edge portion of the screen for changing said deflection current an amount sufficient to deflect said beam to another edge portion of said screen.

8. In a mobile radar system, a display system including a cathode ray tube having a screen, first beam deflecting means for radially deflecting the electron beam of said tube in plan-position fashion across said screen, and second beam deflecting means to which a direct current may be applied for deflecting said electron beam; means for applying a direct current to said second beam deflecting means for deflecting said electron beam in accordance with the movement of said radar system; and means responsive to the deflection of said electron beam by said second beam deflecting means to a point a predetermined radius from the center of said screen for changing said deflection current an amount sufficient to deflect said beam to a new position on said screen.

9. In a true motion radar system, a display device including a screen, means for producing on said screen a display which incudes a mark indicative of own ship's position, said means also including means for causing said mark to move from a point near a boundary of said screen along a path on said screen at a certain speed, said path and said speed being representative of own ship's course and speed, respectively, and means responsive to said mark being moved to a location that is a predetermined distance from another boundary of said screen for resetting said mark to a position astern of the direction of motion of said mark at the time of said reset.

10. A true motion radar system to be borne by a mobile craft, said system comprising means for producing in polar coordinates a display for showing own craft's position and the position of objects in the vicinity of own craft, own craft's position being indicated by a reference point indication on said display, means for initially positioning said reference point indication near the boundary of said display, means for causing said reference point indication to move from said initial position along a path on said display at a certain speed, said path and said speed being representative of own craft's course and speed, respectively, and means for resetting the position of said reference point indication on said display in response to said reference point indication being moved to a position that is a predetermined distance from the boundary of said display.

11. Navigation apparatus to be borne by a mobile craft, said apparatus comprising, a display device including a screen, means for displaying a record of own craft's course on said screen, said means including locating equipment having means for indicating the position of remote objects in direction and range from a predetermined reference point displayed on said screen, said reference point being indicative of own craft's position, means for shifting said reference point from a predetermined starting position in accordance with own craft's instantaneous position whereby the courses of moving objects appear in true relation to own craft's course, and means for resetting said reference point in response to said reference point reaching a position close to an edge of said screen.

References Cited in the file of this patent

UNITED STATES PATENTS

| | | |
|---|---|---|
| 2,471,264 | Doherty | May 24, 1949 |
| 2,688,130 | Whitaker | Aug. 31, 1954 |
| 2,697,827 | Whitaker | Dec. 21, 1954 |
| 2,701,352 | Kingdon | Feb. 1, 1955 |
| 2,717,330 | Meagher | Sept. 6, 1955 |